(12) United States Patent
Takeda et al.

(10) Patent No.: US 11,030,532 B2
(45) Date of Patent: Jun. 8, 2021

(54) INFORMATION PROCESSING APPARATUS, INFORMATION PROCESSING METHOD, AND NON-TRANSITORY COMPUTER READABLE STORAGE MEDIUM

(71) Applicant: YAHOO JAPAN CORPORATION, Tokyo (JP)

(72) Inventors: Ryotaro Takeda, Tokyo (JP); Takuya Nomura, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 862 days.

(21) Appl. No.: 15/693,957

(22) Filed: Sep. 1, 2017

(65) Prior Publication Data

US 2018/0137421 A1    May 17, 2018

(30) Foreign Application Priority Data

Nov. 11, 2016  (JP) .............................. JP2016-220613

(51) Int. Cl.
| | |
|---|---|
| *G06N 5/02* | (2006.01) |
| *G06F 16/951* | (2019.01) |
| *G06F 16/335* | (2019.01) |
| *G06Q 30/02* | (2012.01) |
| *G06N 20/00* | (2019.01) |
| *G06N 7/00* | (2006.01) |
| *G06N 5/04* | (2006.01) |

(52) U.S. Cl.
CPC .............. *G06N 5/02* (2013.01); *G06F 16/337* (2019.01); *G06F 16/951* (2019.01); *G06N 7/005* (2013.01); *G06N 20/00* (2019.01); *G06Q 30/0241* (2013.01); *G06N 5/04* (2013.01)

(58) Field of Classification Search
None
See application file for complete search history.

(56) References Cited

U.S. PATENT DOCUMENTS

2016/0034969 A1* 2/2016 Mazurov ............ G06Q 30/0269
705/14.66

FOREIGN PATENT DOCUMENTS

| JP | 2003-216776 A | 7/2003 |
| JP | 2016-118918 A | 6/2016 |

OTHER PUBLICATIONS

Maurer, Counteracting Phishing Through HCI: Detecting Attacks and Warning Users, Dissertation, LMU Munchen: Fakultät für Mathematik, Informatik und Statistik, 2013, pp. 1-303 (Year: 2013).*
Desai, To Study the Social Media Sentimental Analysis Using Facebook as Platform, Masters Thesis, D.Y. Patil University, 2017, pp. 1-111 (Year: 2017).*

* cited by examiner

*Primary Examiner* — Wilbert L Starks
(74) *Attorney, Agent, or Firm* — Oliff PLC

(57) ABSTRACT

An information processing apparatus discloses herein includes an acquiring unit and an estimating unit. The acquiring unit acquires a plurality of pieces of identity information including a keyword based on an operation performed by a user. The estimating unit estimates an age group of the user based on the plurality of pieces of identity information acquired by the acquiring unit.

10 Claims, 6 Drawing Sheets

INFORMATION PROCESSING APPARATUS, INFORMATION PROCESSING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2016-220613 filed in Japan on Nov. 11, 2016.

BACKGROUND OF THE INVENTION

1. Field of the Invention

The present invention relates to an information processing apparatus, an information processing method, and a non-transitory computer readable storage medium having stored therein an information processing program.

2. Description of the Related Art

Conventionally, a technology for estimating attribute information on a user has been proposed. In relation to this technology, there is a known technology that calculates, by using a learning device for calculating a feature value from an image, a feature value of an image that has been selected by a user, and estimates attribute information on the user based on the calculated feature value (see Japanese Laid-open Patent Publication No. 2016-118918). Furthermore, there is a known technology that detects a set of web pages accessed by a user, maps at least a subset of web pages to a first data structure for discriminating a web-page access pattern of the user, compares the first data structure with a second data structure for discriminating a web-page access pattern of a set of known users having a common user profile attribute, and assigns a user profile attribute to the user in response to a comparison result (see Japanese Laid-open Patent Publication No. 2003-216776).

However, if the level of estimation accuracy of the user attribute is raised, in some cases, it may be difficult to provide an advertising content based on the user attribute.

SUMMARY OF THE INVENTION

It is an object of the present invention to at least partially solve the problems in the conventional technology.

An information processing apparatus according to the present application includes an acquiring unit that acquires a plurality of pieces of identity information including a keyword based on an operation performed by a user, and an estimating unit that estimates an age group of the user based on the plurality of pieces of identity information acquired by the acquiring unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an information processing apparatus, an information processing method, and a non-transitory computer readable storage medium having stored therein an information processing program according to the present application will be described below with reference to the drawings. The information processing apparatus according to an embodiment acquires a plurality of pieces of identity information including a keyword based on an operation performed by a user, and estimates an age group of the user based on the plurality of pieces of the acquired identity information. The keyword based on the operation performed by the user is, for example, a "list of words of interest" estimated based on past behaviors of the user. The information processing apparatus according to the embodiment selects a content or advertising to be provided to the user based on the estimated age group of the user, and therefore can provide a content or advertising appropriate for the age group of the user.

1. Configuration of Content Providing System 1

Figure 1:
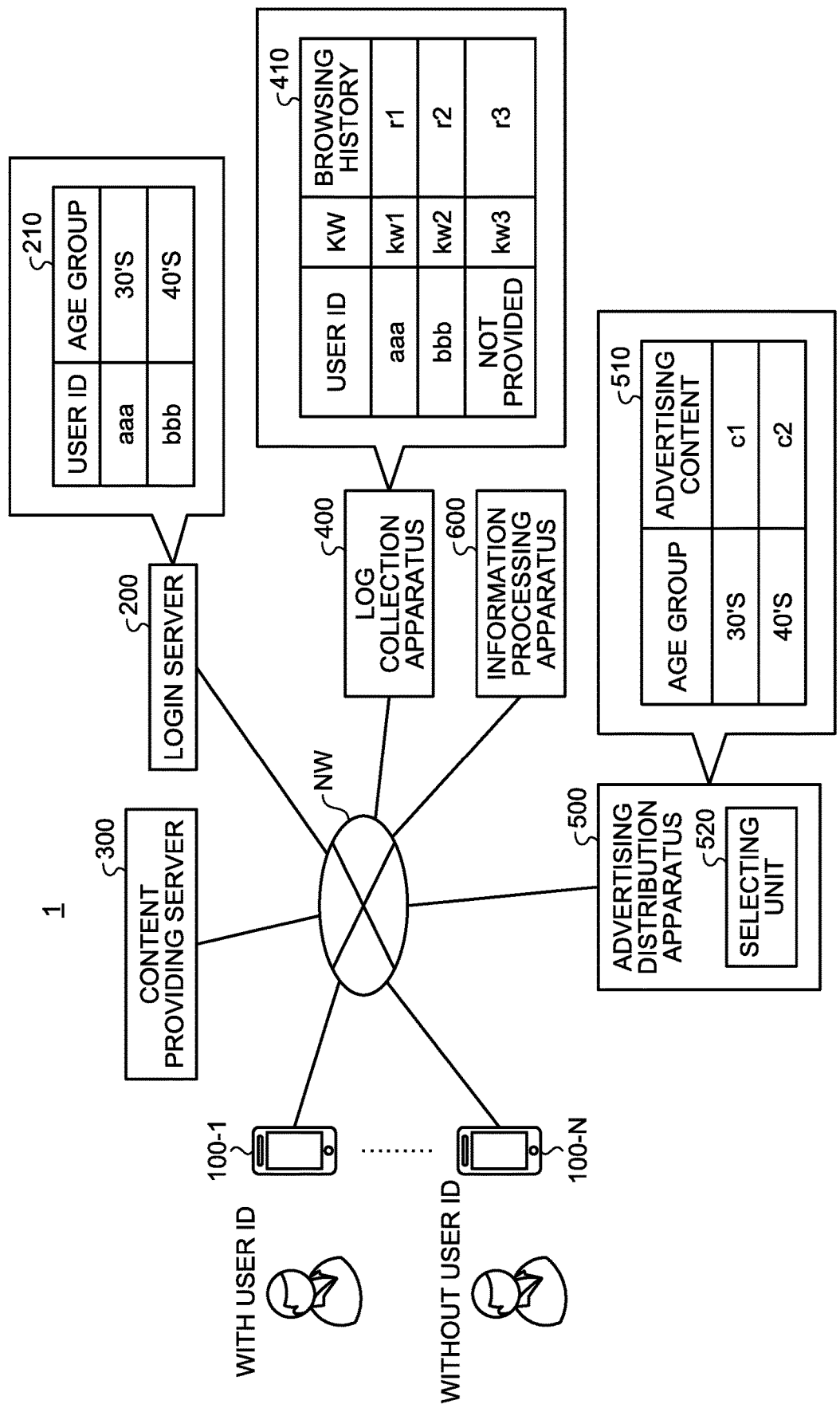
FIG. 1 is a block diagram illustrating an example of a functional configuration of a content providing system 1 according to an embodiment.

FIG. 1 is a block diagram illustrating an example of a functional configuration of a content providing system 1 according to the embodiment. The content providing system 1 includes, for example, a plurality of terminal devices 100-1, . . . , 100-N, a login server 200, a content providing server 300, a log collection apparatus 400, an advertising distribution apparatus 500, and an information processing apparatus 600. N is a natural number equal to or greater than 2. In the following descriptions, the terminal devices may be described as terminal devices 100 when they are not distinguished from one another. In the example in FIG. 1, a plurality of the terminal devices 100, the login server 200, the content providing server 300, the log collection apparatus 400, the advertising distribution apparatus 500, and the information processing apparatus 600 are connected to a network NW. The network NW includes, for example, a wireless base station, a Wi-Fi access point, a communication line, a provider, the Internet, and the like. All combinations of the above-described components do not necessarily have to be enabled to communicate with each other, and the network NW may include a local network as a part thereof.

The terminal device 100 is a device used by a user (a regular user). The terminal device 100 is, for example, a mobile phone, such as a smartphone, or a computer device (a communication device), such as a tablet terminal or a personal computer. When a user agent (UA), such as a web browser, is activated and a predetermined operation is performed by a user, the terminal device 100 transmits a request to the content providing server 300 and the advertising distribution apparatus 500. Then, the terminal device 100 generates a web screen based on a content returned from the content providing server 300, and displays the web screen on a display unit. Furthermore, the terminal device 100 displays advertising based on advertising information returned from the advertising distribution apparatus 500. It may be possible to use an arbitrary application program instead of the web browser, as a means for acquiring a content.

The terminal device 100 is used by a user who has a user ID or a user who does not have a user ID. When input of a user ID is received or a user ID is stored, the terminal device 100 transmits a request including the user ID to the login server 200 and the content providing server 300. When a user ID is not input or a user ID is not stored, the terminal device 100 transmits a request that does not include a user ID to the content providing server 300.

The login server 200 is a server device that manages login done by the user. The login server 200 refers to a user information database 210 and performs user authentication based on the user ID. The login server 200 sends an authentication result to the content providing server 300. The user information database 210 is implemented by a hard disk drive (HDD), a flash memory, a random access memory (RAM), a read only memory (ROM), or a hybrid storage device that is a combination of some of the above-described elements. Furthermore, a part or all of the user information database 210 may be implemented by an external device, such as a network attached storage (NAS) or an external storage server, that can be accessed by the login server 200. The user information database 210 is information in which the user ID is associated with an attribute, such as an age group of the user.

The content providing server 300 is, for example, a server device that provides a content, such as a news article. The content providing server 300 provides a content in response to a content browsing request received from the terminal device 100. If the request includes a query input by the user, the content providing server 300 transmits the query to the log collection apparatus 400.

The log collection apparatus 400 collects log information used by the information processing apparatus 600 and other kinds of information. The log collection apparatus 400 includes a log database 410. The log database 410 is implemented by an HDD, a flash memory, a RAM, a ROM, or a hybrid storage device that is a combination of some of the above-described elements. Furthermore, a part or all of the log database 410 may be implemented by an external device, such as a NAS or an external storage server, that can be accessed by the log collection apparatus 400. In the log database 410, for example, the user ID is associated with a search keyword (KW) and a content browsing history. The search keyword is, for example, a query that has been received by the content providing server 300 based on input from the user. Furthermore, when the content providing server 300 receives a request from the terminal device 100-N based on an operation performed by a user who does not have a user ID, information for identifying the terminal device 100 (not illustrated) is associated with the search keyword and the content browsing history in the log database 410.

The advertising distribution apparatus 500 distributes advertising information to be provided to the terminal device 100. The advertising distribution apparatus 500 includes an advertising information database 510 and a selecting unit 520. The advertising information database 510 is implemented by an HDD, a flash memory, a RAM, a ROM, or a hybrid storage device that is a combination of some of the above-described elements. Furthermore, a part or all of the advertising information database 510 may be implemented by an external device, such as a NAS or an external storage server, that can be accessed by the advertising distribution apparatus 500. In the advertising information database 510, an age group and an advertising content are associated with each other. The selecting unit 520 selects an advertising content corresponding to the age group of the user by referring to the advertising information database 510, and provides the selected advertising content to the terminal device 100.

2. Entire Process Performed by Content Providing System 1

Figure 2:
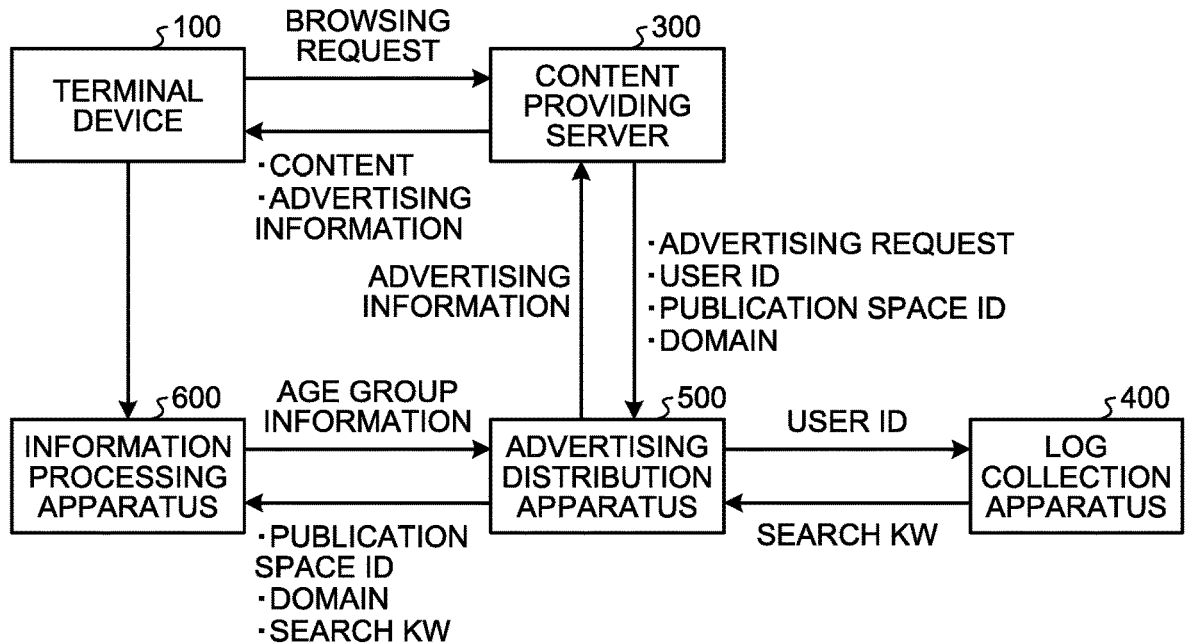
FIG. 2 is a diagram illustrating an overview of the entire process in the content providing system 1 according to the embodiment.

FIG. 2 is a diagram illustrating an overview of the entire process in the content providing system 1 according to the embodiment. The terminal device 100 transmits a browsing request including a query to the content providing server 300 based on an operation received from the user. The content providing server 300 selects a content based on the query in response to the browsing request. In addition, the content providing server 300 transmits an advertising request as a request for advertising information to be embedded in a content, the user ID, a publication space ID, and a domain to the advertising distribution apparatus 500. The advertising distribution apparatus 500 transmits the received user ID to the log collection apparatus 400. The log collection apparatus 400 returns a search keyword corresponding to the user ID to the advertising distribution apparatus 500. The advertising distribution apparatus 500 transmits, as a plurality of pieces of identity information, the publication space ID and the domain received from the content providing server 300 and the search keyword received from the log collection apparatus 400 to the information processing apparatus 600. The plurality of pieces of identity information may be a plurality of search keywords. The plurality of pieces of identity information may include the search keyword and other kinds of identity information. The plurality of pieces of identity information may be the search keyword and the publication space ID, or may be the search keyword and the domain.

The information processing apparatus 600 transmits age group information estimated based on the publication space ID, the domain, and the search keyword to the advertising distribution apparatus 500. The advertising distribution apparatus 500 selects advertising information based on the age group information received from the information processing apparatus 600, and transmits the selected advertising information to the content providing server 300. Accordingly, the content providing server 300 embeds the advertising information in the selected content, and transmits the content with the embedded advertising information to the terminal device 100.

When the browsing request does not include a user ID, the content providing server 300 transmits information on the user instead of the user ID to the advertising distribution apparatus 500, and the log collection apparatus 400 returns a search keyword corresponding to the information on the user to the advertising distribution apparatus 500. Furthermore, the advertising distribution apparatus 500 may extract a keyword from an advertising content based on an advertising click history.

3. Configuration of Information Processing Apparatus 600

Figure 3:
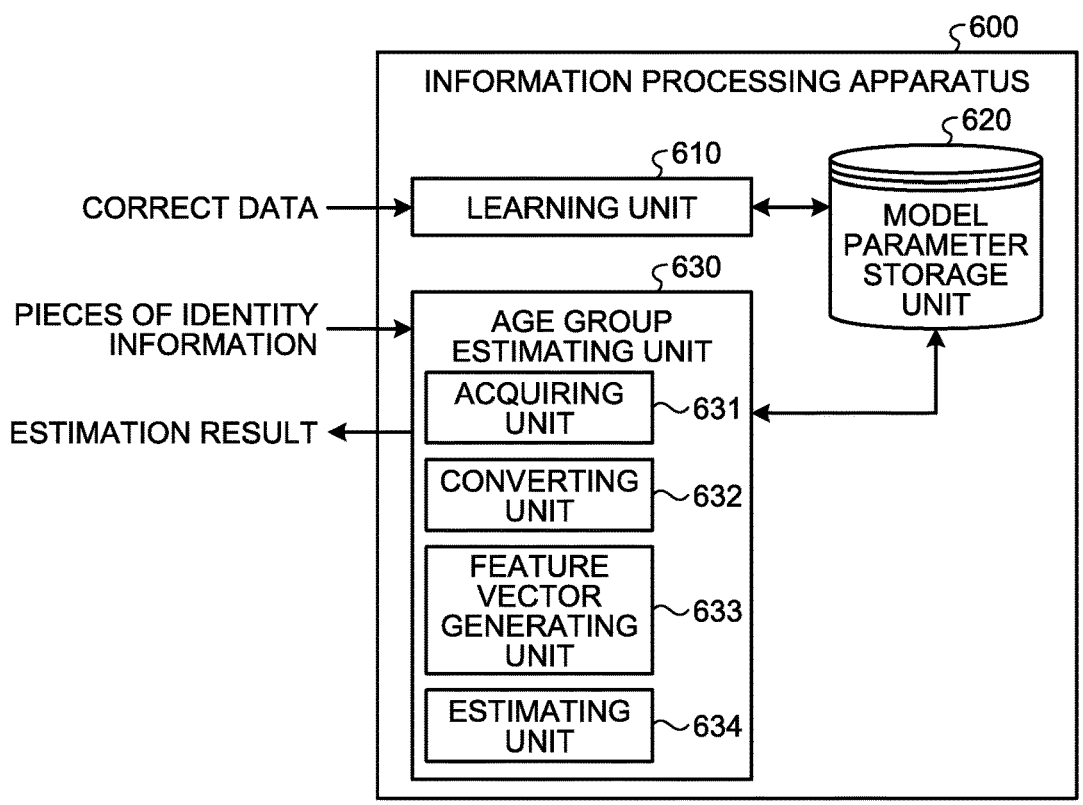
FIG. 3 is a configuration diagram illustrating an example of an information processing apparatus 600.

FIG. 3 is a configuration diagram illustrating an example of the information processing apparatus 600. The information processing apparatus 600 includes, for example, a learning unit 610, a model parameter storage unit 620, and an age group estimating unit 630. The components are implemented by, for example, causing a processor, such as a central processing unit (CPU) to execute an information processing program stored in advance. Furthermore, the components may be implemented by hardware (a circuit unit or a circuitry), such as a large scale integration (LSI), an application specific integrated circuit (ASCI), or a field-programmable gate array (FPGA), or may be implemented by cooperation of software and hardware.

The learning unit 610 generates an age group estimation model by using correct data. For example, the learning unit 610 learns a parameter in the age group estimation model by minimizing a multiclass cross-entropy error function by using the stochastic gradient descent method. The model parameter storage unit 620 stores therein the parameter of the age group estimation model learned by the learning unit 610.

The age group estimating unit 630 includes, for example, an acquiring unit 631, a converting unit 632, a feature vector generating unit 633, and an estimating unit 634. The acquiring unit 631 acquires a plurality of pieces of identity information from the content providing server 300 and/or the log collection apparatus 400. The acquiring unit 631 may extract a keyword from an advertising content based on an advertising click history, and may generate a keyword for estimating an age group. The converting unit 632 converts the plurality of pieces of identity information to respective hash values as fixed-length values with a same fixed length. The feature vector generating unit 633 generates a single feature vector by using the plurality of hash values converted by the converting unit 632. The estimating unit 634 estimates the age group of the user by operating the age group estimation model using the single feature vector.

Figure 4:
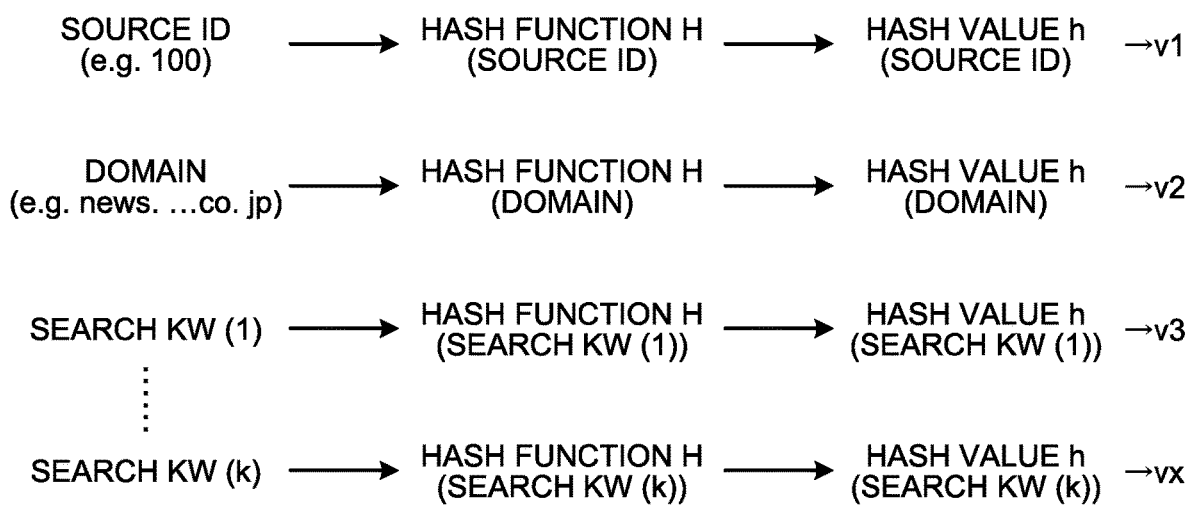
FIG. 4 is a diagram for explaining a process of converting a plurality of pieces of identity information to respective hash values.

A process of converting the identity information to a hash value will be described below. FIG. 4 is a diagram for explaining a process of converting the plurality of pieces of identity information to respective hash values. It is assumed that the plurality of pieces of identity information acquired by the acquiring unit 631 include a publication space ID with a value of "100", a domain represented by a character string of "news . . . co.jp", and k search keywords. The converting unit 632 applies a predetermined hash function H(publication space ID) to the publication space ID to thereby obtain a hash value h(publication space ID). The converting unit 632 applies a predetermined hash function H(domain) to the domain to thereby obtain a hash value h(domain). The converting unit 632 applies predetermined hash functions H(search KW (1)) to H(search KW (k)) to the respective search keywords (1) to (k) to thereby obtain hash values h(search KW (1)) to h(search KW (k)). The predetermined hash functions H are the same hash function, and the converting unit 632 converts the plurality of pieces of identity information to respective fixed-length values with a same fixed length. The hash value h(publication space ID) is set to a predetermined value v1. The hash value h(domain) is set to a predetermined value v2. The hash values h(search KW (1)) to h(search KW (k)) are set to predetermined values v3 to vx, respectively.

4. Process of Generating Feature Vector

Figure 5:
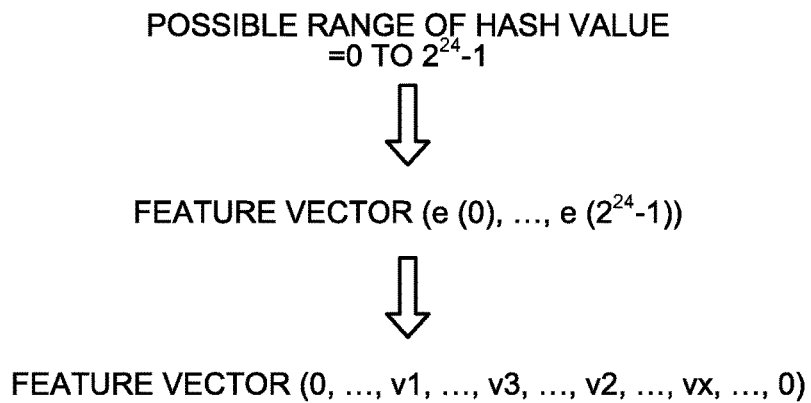
FIG. 5 is a diagram for explaining a process of generating a single feature vector by using a plurality of hash values.

A process of generating a feature vector will be described below. FIG. 5 is a diagram for explaining a process of generating a single feature vector by using a plurality of hash values. The hash value calculated by the hash function H is calculated as any value in a predetermined possible range. In the single feature vector generated by using the plurality of hash values, the number of dimensions in which elements of the feature vector are assigned is set to a value corresponding to the possible range of the hash value. For example, if a hash size is $2^{24}$, the possible range of the hash value h is 0 to $(2^{24})-1$, the number of dimensions of the feature vector is $2^{24}$, and the feature vector includes elements from a zero-dimensional element e(0) to a $(2^{24})-1$-dimensional element $e(2^{24})-1$. Of the values of all of the elements in the feature vector, values of the elements corresponding to the hash values are set to the predetermined values corresponding to the respective hash values. The element of a dimension corresponding to the hash value h(publication space ID) is set to the predetermined value v1. The element of a dimension corresponding to the hash value h(domain) is set to the predetermined value v2. The elements of dimensions corresponding to the hash values h(search KW (1)) to h(search KW (k)) are set to the predetermined values v3 to vx, respectively.

5. Process of Estimating Age Group

A process of estimating the age group of the user will be described below. The estimating unit 634 estimates the age group of the user by operating the age group estimation model. The age group estimation model is represented by Expression (1) below. P is a probability (score) used to determine the age group of the user, x is a feature vector, W is a weight matrix to be multiplied by the feature vector x, and b is a bias vector.

$$P(Y = i \mid x, W, b) = \text{soft max}_i (Wx + b) \qquad (1)$$

$$= \frac{e^{W_i x + b_i}}{\sum_j e^{W_j x + b_j}}$$

The probability P includes, as elements, a plurality of age groups to be estimated. It is assumed that target age groups to be estimated are classified into five classes such as a class of 22 to 29 years old, a class of 30 to 39 years old, a class of 40 to 49 years old, a class of 50 to 59 years old, and a class of 60 to 69 years old. In this case, the probability P is represented as a five-dimensional vector in one direction, the weight matrix W is represented as a two-dimensional matrix of $5 \times 2^{24}$, and the feature vector x is represented as a $2^{24}$ dimensional matrix in one direction. Expression (2) represents the age group estimation model in a matrix form.

$$\begin{pmatrix} P1 \\ P2 \\ P3 \\ P4 \\ P5 \end{pmatrix} = \text{soft max} \left[ \begin{pmatrix} w11 & \cdots & w2^{24}5 \\ \vdots & \ddots & \\ w51 & & w52^{24} \end{pmatrix} (e(0), \ldots, e(2^{24})) + \begin{pmatrix} b1 \\ b2 \\ b3 \\ b4 \\ b5 \end{pmatrix} \right] \qquad (2)$$

As indicated by Expression (2), the probability P includes P1 to P5 as elements corresponding to the respective classes. P1 is the probability that the user is 22 to 29 years old, P2 is the probability that the user is in 30 to 39 years old, P3 is the probability that the user is 40 to 49 years old, P4 is the probability that the user is 50 to 59 years old, and P5 is the probability that the user is 60 to 69 years old. The weight matrix W includes w11 to $w52^{24}$ as the elements corresponding to the number of the classes and the number of the dimensions of the feature vector x. The bias vector b includes b1 to b5 as elements corresponding to the respective classes. The value of the bias vector b is set to a value that makes it easy to estimate any of the classes or that makes it difficult to estimate any of the classes.

As indicated by Expression (1), the estimating unit 634 calculates the probability P of each of the age groups by using a value that is obtained by first multiplying the feature vector x by the weight matrix W and then adding the bias vector b. Specifically, the estimating unit 634 calculates the probability P by inputting (Wx+b) in the softmax function.

The predetermined values corresponding to the respective hash values may uniformly be set to "1" or may be set to different values for the respective hash values. For example, a predetermined value for a hash value of a search keyword corresponding to a query that has been input many times by a user among search keywords may be set to a value greater than "1".

Figure 6:
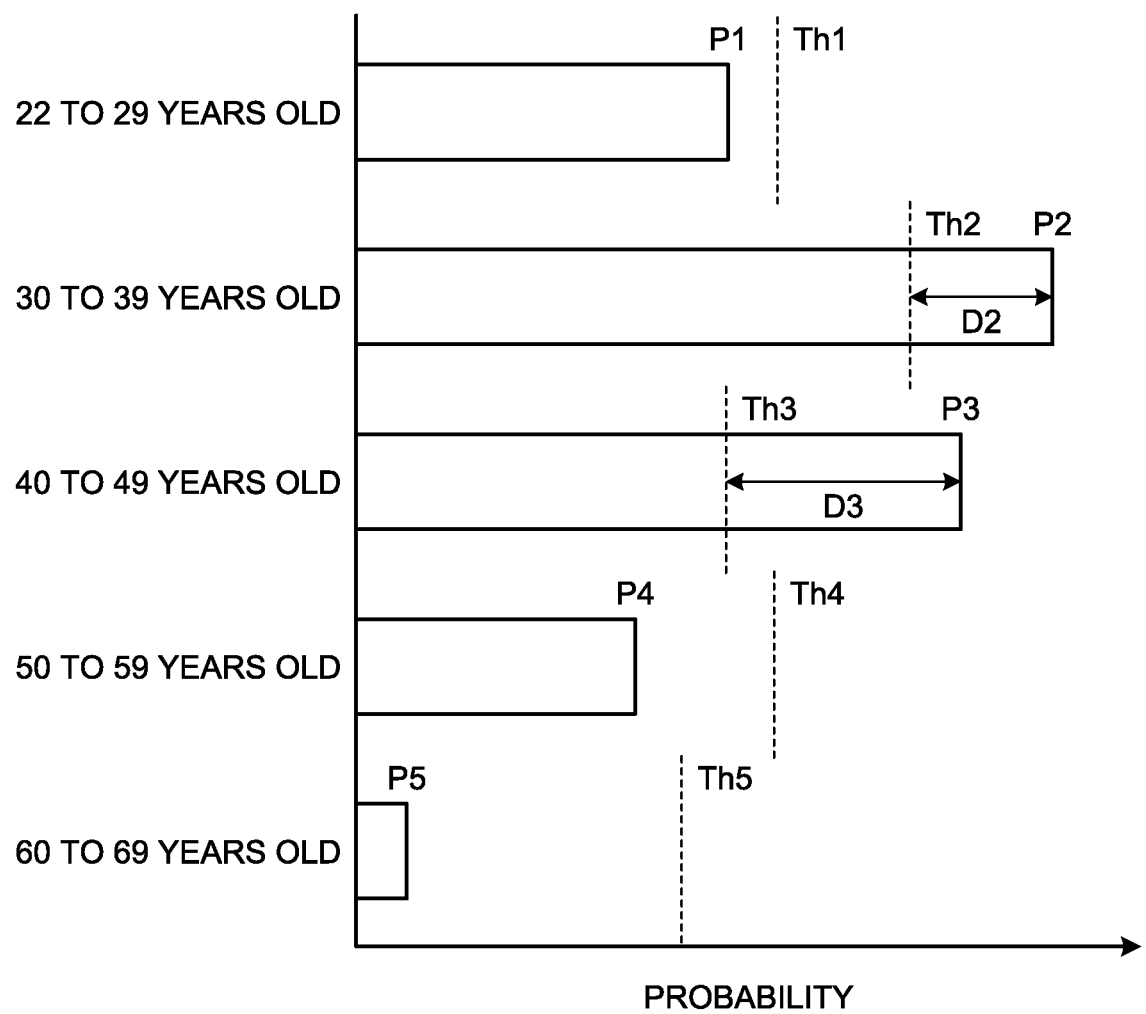
FIG. 6 is a diagram illustrating a relationship between the probability of each of age groups and a threshold.

The estimating unit 634 estimates the age group of the user based on the plurality of probabilities P. FIG. 6 is a diagram illustrating a relationship between the probability of each of the age groups and a threshold. The estimating unit 634 compares the calculated probabilities P corresponding to the respective classes to thereby estimate the age group of the user. If a rule is set such that the age group with the highest probability P is used as an estimation result, the estimating unit 634 estimates that the age group of the user corresponds to 30 to 39 years old.

The estimating unit 634 may set thresholds Th1 to Th5 for the respective age groups, and may estimate that the age group for which a difference between the probabilities P1 to P5 calculated for the respective age groups and the thresholds Th1 to Th5 set for the respective age groups is the greatest corresponds to the age group of the user. The estimating unit 634 estimates that the age group of the user is 40 to 49 years old because a difference D3 between the probability P3 and the threshold Th3 for the age group of 40 to 49 years old is greater than a difference D2 between the probability P2 and the threshold Th2 for the age group of 30 to 39 years old.

The estimating unit 634 may estimate that the age group for which a ratio of the probabilities P1 to P5 calculated for the respective age groups to the thresholds Th1 to Th5 set for the respective age groups is the greatest corresponds to the age group of the user. The estimating unit 634 estimates that the age group of the user is 40 to 49 years old because a ratio of the probability P3 and the threshold Th3 for the age group of 40 to 49 years old is greater than a ratio of the probability P2 and the threshold Th2 for the age group of 30 to 39 years.

The estimating unit 634 sets the thresholds Th1 to Th5 for the respective age groups such that the probability that the estimated age group is correct becomes equal to a predetermined value for each of the age groups. The estimating unit 634 sets the thresholds Th1 to Th5 such that the accuracy rate of the estimated age group meets the predetermined value. To realize this, the information processing apparatus 600 generates evaluation data. The evaluation data includes a correct value that is the age group associated with the user ID in the user information database 210, the age group that is estimated by the age group estimating unit 630 based on the search keyword and the browsing history associated with the user ID in the log database 410, and a ratio at which the estimated age group matches the age group provided as the correct value. If the ratio at which the estimated age group matches the age group provided as the correct value is lower than a predetermined value (for example, 70%) with reference to the evaluation data, the age group estimating unit 630 increases the threshold. If the ratio at which the estimated age group matches the age group provided as the correct value is higher than a predetermined value (for example, 70%) with reference to the evaluation data, the age group estimating unit 630 decreases the threshold.

While it is assumed that the target age group to be estimated is classified into five classes in the age group estimation process, the present embodiment is not limited to this example. It may be possible to arbitrarily set the number of the classes and age ranges corresponding to the respective classes.

6. Learning Process

An example of a process of learning the weight matrix W and the bias vector b will be described below.

Expression (3) below is a function E that quantifies an error between an estimation result (an output value of the softmax function) and a correct value in a process of classification into k classes (output data) based on a plurality of pieces of identity information (input data). This function is referred to as a multiclass cross-entropy error. In Expression (3), $y_{nk}$ indicates $k^{th}$-dimensional output corresponding to $n^{th}$ input data, and $t_{nk}$ indicates a value of corresponding correct data.

$$E_n = -\sum_k t_{nk} \ln y_{nk} \quad (3)$$

In Expression (3), a loss function (i.e., a value of E) decreases as the input data approaches the correct data. The learning unit 610 adjusts the values of the weight matrix W and the bias vector b such that the loss function decreases.

When obtaining the value of the weight matrix W, the learning unit 610 initializes the weight matrix W to a random value or a fixed value, such as zero, and operates a predetermined algorithm to learn the weight matrix W such that the loss function decreases. In this learning, the learning unit 610 applies a model referred to as the stochastic gradient decent method and adjusts elements ($w_{ij}$) of the weight matrix W in a direction in which energy (a difference between weights) decreases by using a value of the gradient. Specifically, the learning unit 610 adjusts the weight $w_{ij}$ by operating a model represented by Expression (4). In Expression (4), $w_{ij}$ is an arbitrary weight included in the weight matrix W. α is a parameter referred to as a learning rate for determining the amount of adjustment per learning. λ is a parameter for determining the degree of regularization. The third term in Expression (4) is referred to as a weight decay and functions to regularize the weight $w_{ij}$. λ is a parameter for determining a gradient, and decreases the weight $w_{ij}$ even when the gradient is zero.

$$w_{ij} \leftarrow w_{ij} - \alpha \frac{\partial E_n}{\partial w_{ij}} - \alpha \lambda w_{ij} \quad (4)$$

7. Flow of Estimation of Age Group

Figure 7:
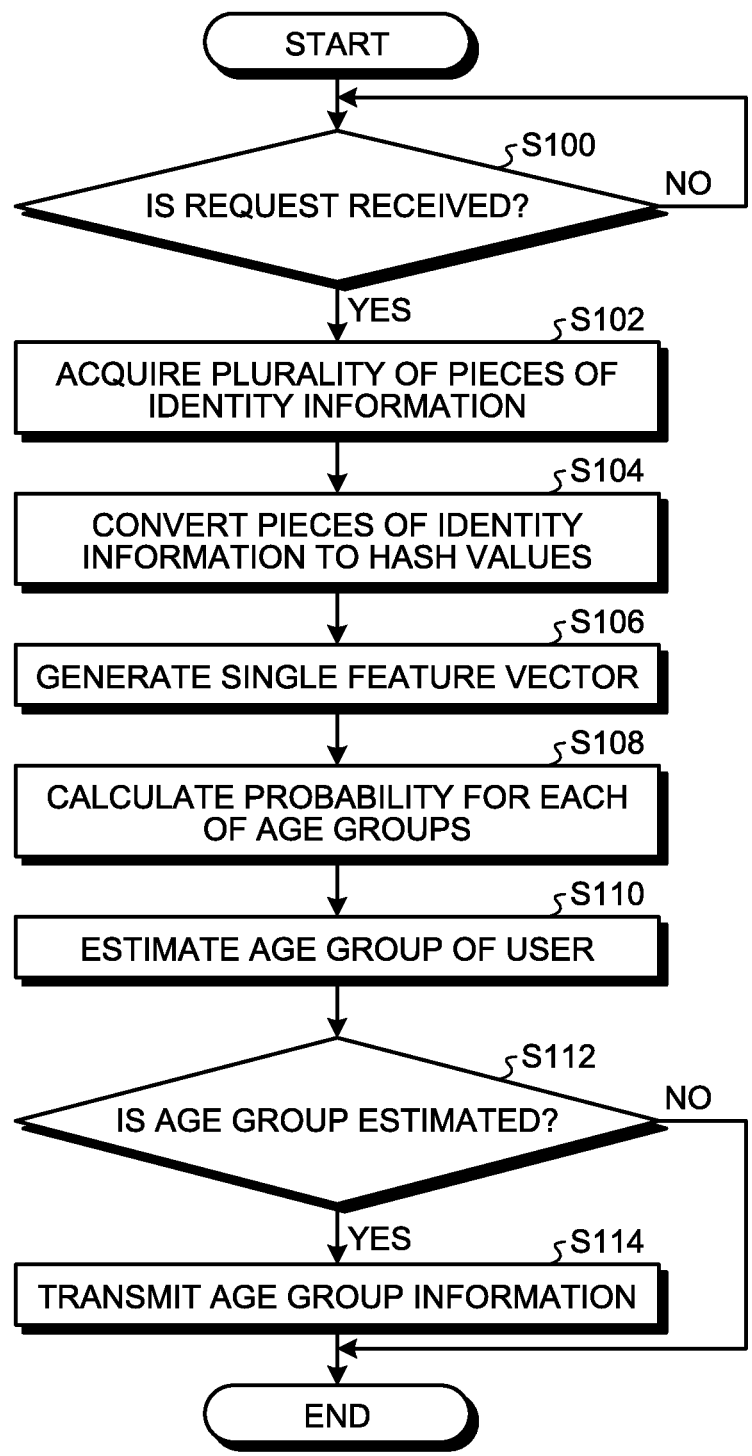
FIG. 7 is a flowchart illustrating an example of the flow of a process of estimating an age group of a user.

FIG. 7 is a flowchart illustrating an example of the flow of a process of estimating the age group of the user. First, the information processing apparatus 600 determines whether a request including a publication space ID and a domain is received from the content providing server 300 (S100). At this time, in response to receiving a browsing request from the terminal device 100 and providing a content to the terminal device 100, the content providing server 300 acquires a publication space ID and a domain related to the content and provides the publication space ID and the domain to the information processing apparatus 600. When the browsing request includes a query, the content providing server 300 transmits the query as a search keyword to the information processing apparatus 600.

The information processing apparatus 600 acquires a plurality of pieces of identity information in response to receiving the request (S102). At this time, the information processing apparatus 600 transmits a request to the log collection apparatus 400 and acquires the search keyword from the log collection apparatus 400. Subsequently, the information processing apparatus 600 converts the plurality of pieces of identity information to respective hash values (S104). The information processing apparatus 600 then generates a single feature vector by using the plurality of hash values (S106). Subsequently, the information processing apparatus 600 calculates, for each of age groups, the probability that the age group corresponds to the age group of the user (S108). The information processing apparatus 600 then estimates the age group of the user based on the calculated probabilities (S110).

Subsequently, the information processing apparatus 600 determines whether the age group of the user is estimated (S112). When the information processing apparatus 600 determines that all of the estimated probabilities do not exceed the thresholds, the age group of the user is not estimated; therefore, the information processing apparatus 600 ends the process in this flowchart without transmitting the age group information. When any of the estimated probabilities exceeds the threshold, the age group of the user is estimated; therefore, the information processing apparatus 600 transmits information including at least one of the age groups to the advertising distribution apparatus 500 (S114).

8. Flow of Learning

Figure 8:
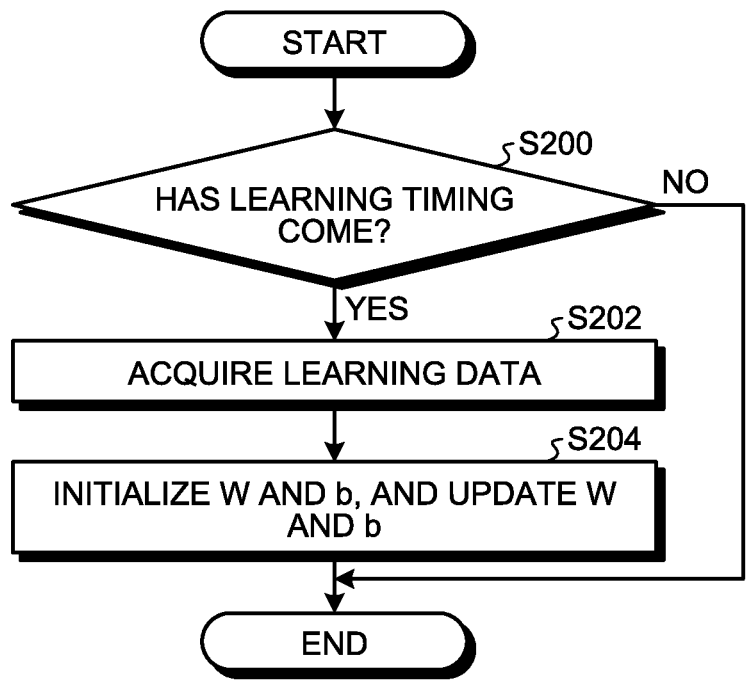
FIG. 8 is a flowchart illustrating an example of the flow of a process of learning a weight matrix W and a bias vector b.

FIG. 8 is a flowchart illustrating an example of the flow of a process of learning the weight matrix W and the bias vector b. First, the information processing apparatus 600 determines whether a learning timing has come (S200). For example, the learning timing comes at predetermined intervals, such as once a day. If the learning timing has come, the information processing apparatus 600 acquires learning data (S202). For example, the information processing apparatus 600 acquires, as the learning data, a search keyword and a content browsing history associated with a user ID for which the age group is already known among logs stored in the log database 410. The information processing apparatus 600 acquires a publication space ID and a domain for a content from the content browsing history. Subsequently, the information processing apparatus 600 initializes the values of the weight matrix W and the bias vector b, and updates the initialized values of the weight matrix W and the bias vector b the same number of times as the number of pieces of the learning data (S204). For example, if the learning data includes 10000 samples, the values of the weight matrix W and the bias vector b are initialized and then the values of the weight matrix W and the bias vector b are updated 10000 times.

9. Effects of Embodiment

As described above, the information processing apparatus 600 according to the embodiment estimates an age group of a user based on a plurality of pieces of identity information including a keyword based on an operation performed by the user; therefore, it is possible to estimate the age group of the user based on a plurality of kinds of identities. Consequently, the information processing apparatus 600 can prevent reduction in the estimation accuracy and increase the coverage of a user attribute to be estimated. Specifically, the plurality of pieces of identity information include at least one of identification information for identifying a content that is provided to the user based on a request transmitted by the terminal device 100 operated by the user and a domain related to the content providing server 300. Furthermore, the information processing apparatus 600 includes the age group estimating unit 630 including the converting unit 632, which converts the plurality of pieces of identity information to respective fixed-length values with the same fixed length, and including the feature vector generating unit 633, which generates a feature vector in a certain number of dimensions corresponding to a possible range of the fixed-length values and which sets values of elements corresponding to the fixed-length values converted by the converting unit 632 among elements of the feature vector to predetermined values. The age group estimating unit 630 estimates the age group of the user by using the feature vector generated by the feature vector generating unit 633. Furthermore, the converting unit 632 converts the plurality of pieces of identity information to the fixed-length values with the same fixed length by obtaining hash values by applying the same hash function to the plurality of pieces of identity information.

Moreover, the information processing apparatus 600 acquires a plurality of keywords based on an operation performed by the user, converts queries to respective fixed-length values, and sets values of dimensions corresponding to the fixed-length values based on the respective queries in the feature vector to values specified for the respective queries; therefore, it is possible to increase the coverage of a to-be-estimated user attribute based on the queries.

Furthermore, the information processing apparatus 600 generates, from the database (210 or 410) in which the age group of the user is associated with the plurality of pieces of identity information, evaluation data including the correct value of the age group of the user corresponding to the plurality of pieces of identity information, including the age group of the user that is estimated by the age group estimating unit 630 based on the plurality of pieces of identity information acquired from the database, and including a ratio at which the estimated age group matches the age group provided as the correct value, and sets thresholds for the respective age groups such that the ratio at which the estimated age group matches the age group provided as the correct value becomes equal to or higher than a predetermined value. Therefore, the information processing apparatus 600 can prevent reduction in the estimation accuracy. Consequently, the information processing apparatus 600 can prevent reduction in the estimation accuracy even when the coverage of a user attribute to be estimated is increased.

10. Hardware Configuration

Figure 9:
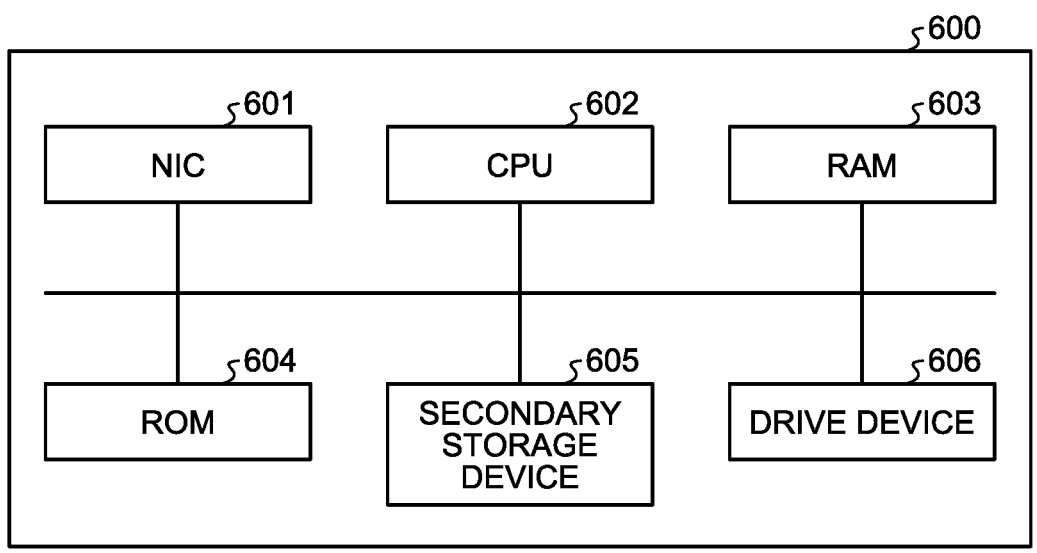
FIG. 9 is a diagram illustrating an example of a hardware configuration of the information processing apparatus 600.

FIG. 9 is a diagram illustrating an example of a hardware configuration of the information processing apparatus 600. The information processing apparatus 600 includes, for example, a NIC 601, a CPU 602, a RAM 603, a ROM 604, a secondary storage device 605, such as a flash memory or an HDD, and a drive device 606, all of which are connected via an internal bus or a dedicated communication line. A portable storage medium, such as an optical disk, is attached to the drive device 606. A program stored in the secondary storage device 605 or a portable storage medium attached to the drive device 606 is loaded on the RAM 603 by a DMA controller (not illustrated) or the like and executed by the CPU 602, so that the functional units of the information processing apparatus 600 are implemented.

According to an embodiment of the present invention, it is possible to prevent reduction in the estimation accuracy and increase the coverage of a user attribute to be estimated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a processor programmed to:
acquire a plurality of pieces of identity information including a keyword based on an operation performed by a user;
convert the plurality of pieces of identity information into a feature vector using hash values corresponding to the plurality of pieces of identity information; and
estimate an age group of the user based on the features vector.

2. The information processing apparatus according to claim 1, wherein the plurality of pieces of identity information includes at least one of identification information for identifying a content that is provided to the user based on a request transmitted by a terminal device operated by the user or a domain related to a server device that provides the content.

3. The information processing apparatus according to claim 1, wherein the processor is programmed to:
generate the feature vector in a certain number of dimensions corresponding to a possible range of respective fixed-length values with a same fixed length based on the converted plurality of pieces of identity information, and set values of elements corresponding to the converted fixed-length values among elements of the feature vector to predetermined values, and
estimate the age group of the user by using the generated feature vector.

4. The information processing apparatus according to claim 3, wherein the processor is programed to convert the plurality of pieces of identity information to the fixed-length values with the same fixed length by obtaining the hash values by applying a same hash function to the plurality of pieces of identity information.

5. The information processing apparatus according to claim 3, wherein the processor is programmed to:
acquire a plurality of the keywords,
convert the plurality of keywords to the respective fixed-length values, and
set values of elements corresponding to the fixed-length values based on the respective keywords of the plurality of keywords in the feature vector to predetermined values.

6. The information processing apparatus according to claim 3, wherein the processor is programmed to calculate, for each of a plurality of age groups, a probability that the age group corresponds to the age group of the user by using the generated feature vector, and estimate the age group of the user based on the calculated probabilities.

7. The information processing apparatus according to claim 6, wherein the processor is programmed to set a plurality of thresholds for the respective age groups, and estimate that the age group for which one of a difference and a ratio of the probabilities calculated for the respective age groups and the thresholds set for the respective age groups is a greatest corresponds to the age group of the user.

8. The information processing apparatus according to claim 7, wherein the processor is programmed to:
generate, from a database in which the age group of the user is associated with the plurality of pieces of identity information, evaluation data including (i) a correct value of the age group of the user corresponding to the plurality of pieces of identity information, (ii) the age group of the user that is estimated based on the plurality of pieces of identity information acquired from the database, and (iii) a ratio at which the estimated age group matches the age group provided as the correct value, and
set thresholds for the respective age groups such that the ratio at which the estimated age group matches the age group provided as the correct value becomes equal to or higher than a predetermined value.

9. An information processing method comprising:
acquiring a plurality of pieces of identity information including a keyword based on an operation performed by a user;
converting the plurality of pieces of identity information into a feature vector using hash values corresponding to the plurality of pieces of identity information; and
estimating an age group of the user based on the feature vector.

10. A non-transitory computer readable storage medium having stored therein an information processing program that causes a computer to execute:
acquiring a plurality of pieces of identity information including a keyword based on an operation performed by a user;
converting the plurality of pieces of identity information into a feature vector using hash values corresponding to the plurality of pieces of identity information; and
estimating an age group of the user based on the feature vector.

* * * * *